(12) United States Patent
Na et al.

(10) Patent No.: US 7,999,884 B2
(45) Date of Patent: Aug. 16, 2011

(54) LIQUID CRYSTAL DISPLAY

(75) Inventors: Heo-Seok Na, Seoul (KR); Kyu-Hun Lim, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 303 days.

(21) Appl. No.: 12/355,708

(22) Filed: Jan. 16, 2009

(65) Prior Publication Data

US 2009/0195726 A1  Aug. 6, 2009

(30) Foreign Application Priority Data

Jan. 31, 2008  (KR) .......................... 10-2008-009954

(51) Int. Cl.
*G02F 1/1333* (2006.01)
*H04B 7/14* (2006.01)
*H01L 21/00* (2006.01)
*G09F 13/04* (2006.01)

(52) U.S. Cl. .............. 349/58; 349/56; 349/61; 349/187; 455/24; 438/30; 362/97.1; 362/97.2

(58) Field of Classification Search .................. 349/58, 349/187, 56, 61, 70; 362/97.1, 97.2, 97.3; 438/30; 455/24
See application file for complete search history.

(56) References Cited

U.S. PATENT DOCUMENTS

| 7,478,942 B2* | 1/2009 | Kim et al. ...................... 362/620 |
| 7,626,672 B2* | 12/2009 | Song ............................. 349/150 |
| 2005/0162869 A1* | 7/2005 | Kanatsu ........................ 362/632 |
| 2008/0143918 A1* | 6/2008 | Kim ................................ 349/58 |
| 2008/0232120 A1* | 9/2008 | Kim et al. ...................... 362/382 |
| 2008/0284939 A1* | 11/2008 | Lee et al. ........................ 349/58 |
| 2009/0195726 A1* | 8/2009 | Na et al. ......................... 349/58 |
| 2010/0265426 A1* | 10/2010 | Jeon et al. ....................... 349/58 |

FOREIGN PATENT DOCUMENTS

| KR | 1020040108327 A | 12/2004 |
| KR | 1020060091143 A | 8/2006 |

* cited by examiner

*Primary Examiner* — Brian M Healy
(74) *Attorney, Agent, or Firm* — Innovation Counsel LLP

(57) ABSTRACT

A liquid crystal display includes a liquid crystal display panel, a light source, a wire, a light guide plate, a bottom chassis, and a light source container. The liquid crystal display panel displays an image, and the light source generates a light. The wire connected to the light source, and the light guide plate guides the light from the light source to the liquid crystal display panel. The bottom chassis receives the light guide plate and the light source, and the bottom chassis is divided into two parts separable with each other. The light source container is integrally formed with the bottom chassis and surrounding at least a portion of the light source. The light source container includes a fixing section fixing the wire.

21 Claims, 5 Drawing Sheets

LIQUID CRYSTAL DISPLAY

CROSS-REFERENCE TO RELATED APPLICATION

This application relies for priority upon Korean Patent Application No. 2008-9954 filed on Jan. 31, 2008, the contents of which are herein incorporated by reference in its entirety.

BACKGROUND

1. Field of the Invention

The present invention relates to a liquid crystal display, and more particularly to a liquid crystal display capable of preventing the separation of a wire for a light source.

2. Description of the Related Art

With the advent of information technologies, demand for high-performance display apparatuses capable of displaying various types of information, such as videos, graphics, and characters, has greatly increased. Due to such demand, the display industry has been rapidly growing.

Particularly, since a liquid crystal display has advantages of low power consumption, light weight, slim form factor, and the suppression of harmful electro-magnetic waves as compared with a cathode ray tube, the liquid crystal display has been greatly advanced for several years as a next-generation high-technology display apparatus. In addition, the liquid crystal display has been extensively employed in various fields such as electronic clocks, electronic calculators, personal computers, and television sets.

The liquid crystal display adjusts light transmittance of a liquid crystal having dielectric anisotropy by using an electric-magnetic field to display an image. To this end, the liquid crystal display includes a liquid crystal panel to display the image through liquid crystal cells prepared in the form of a matrix, a panel driver to drive the liquid crystal panel, a backlight assembly to supply light to the liquid crystal panel, a mold frame to receive the liquid crystal panel and the backlight assembly, and a bottom chassis and a top chassis to fix and protect the above elements.

The backlight assembly includes a lamp wire to apply a voltage to a lamp in order to supply light. The lamp wire is withdrawn through a wire take-out section provided at the sidewall of the bottom chassis and connected to an inverter.

Recently, in the structure of a backlight applied to most monitor products, a lamp cover is omitted and the bottom chassis has served as a lamp cover. Accordingly, the lamp is fixed by the mold frame, and the lamp wire is fixed by the bottom chassis and an adhesive tape. However, according to the above scheme of fixing the lamp and the lamp wire, the lamp wire is pressed or delaminated by the top chassis when the top chassis is coupled with the mold frame and the bottom chassis, so that voltage failure occurs.

SUMMARY

Therefore, the present invention provides a liquid crystal display capable of stably fixing a wire for a light source.

In an embodiment of the present invention, a liquid crystal display includes a liquid crystal display panel, a light source, a wire, a light guide plate, a bottom chassis, and a light source container. The liquid crystal display panel displays an image and the light source generates a light. The wire connected to the light source, and the light guide plate guides the light from the light source to the liquid crystal display panel. The bottom chassis receives the light guide plate and the light source, and the bottom chassis is divided into two parts separable with each other so that the light guide plate is easily received. The light source container is integrally formed with the bottom chassis and surrounds at least a portion of the light source. The light source container includes a fixing section fixing the wire.

The light source comprises one of a cold cathode fluorescent lamp and a hot cathode fluorescent lamp.

The liquid crystal display comprises an wire take-out section provided at an end portion of the light source container to withdraw the wire. The wire take-out section includes a lamp holder fixing the end portion of the light source.

The fixing section includes a fixing member formed at a side surface of the light source container.

The fixing member includes a nesting section and a hook section. The nesting section extends outward from the side surface of the light source container to nest the wire. The hook section is bent at an end of the nesting section to prevent the wire from being separated.

The hook section surrounds the wire from a lower portion to an upper portion of the wire vertically.

Meanwhile, the hook section surrounds the wire from an upper portion to a lower portion of the wire vertically.

In addition, the fixing section includes a recess that extends inward from a side surface of the light source container.

A reflective sheet may be provided. The reflective sheet extends along a sidewall of the light source container to reflect light At least a portion of the light source container may cover a top surface of the light guide plate provided adjacent to a light incident surface of the light guide plate.

A portion of the reflective sheet may be interposed between the top surface of the light guide plate and the light source container covering the top surface of the light guide plate.

An optical sheet may be provided between the light guide plate and the liquid crystal display panel. The optical sheet includes a diffusion sheet, a prism sheet, and a protective sheet.

The liquid crystal display includes a mold frame coupled with the bottom chassis. The mold frame includes a fixing groove corresponding to the fixing section.

A top chassis coupled with an outer side surface of the mold frame may be further provided to protect the liquid crystal display panel and the backlight assembly.

In another exemplary embodiment of the present invention, a method of manufacturing a liquid crystal display is provided as follows.

A liquid crystal display panel is formed. A backlight assembly is formed. The backlight assembly includes a light source, a wire connected to the light source and a light guide plate. A bottom chassis divided into two parts separable with each other is provided. The bottom chassis includes a light source container integrally formed with the bottom chassis and surrounding at least a portion of the light source, and a fixing section fixing the wire.

According to the above, a fixing section is provided in a bottom chassis to fix a wire for a light source, thereby preventing the wire from being separated, and preventing the liquid crystal display from malfunctioning through a stable wire fixing structure.

BRIEF DESCRIPTION OF THE DRAWINGS

The above and other advantages of the present invention will become readily apparent by reference to the following detailed description when considered in conjunction with the accompanying drawings wherein.

DESCRIPTION OF THE EMBODIMENTS

Figure 1:
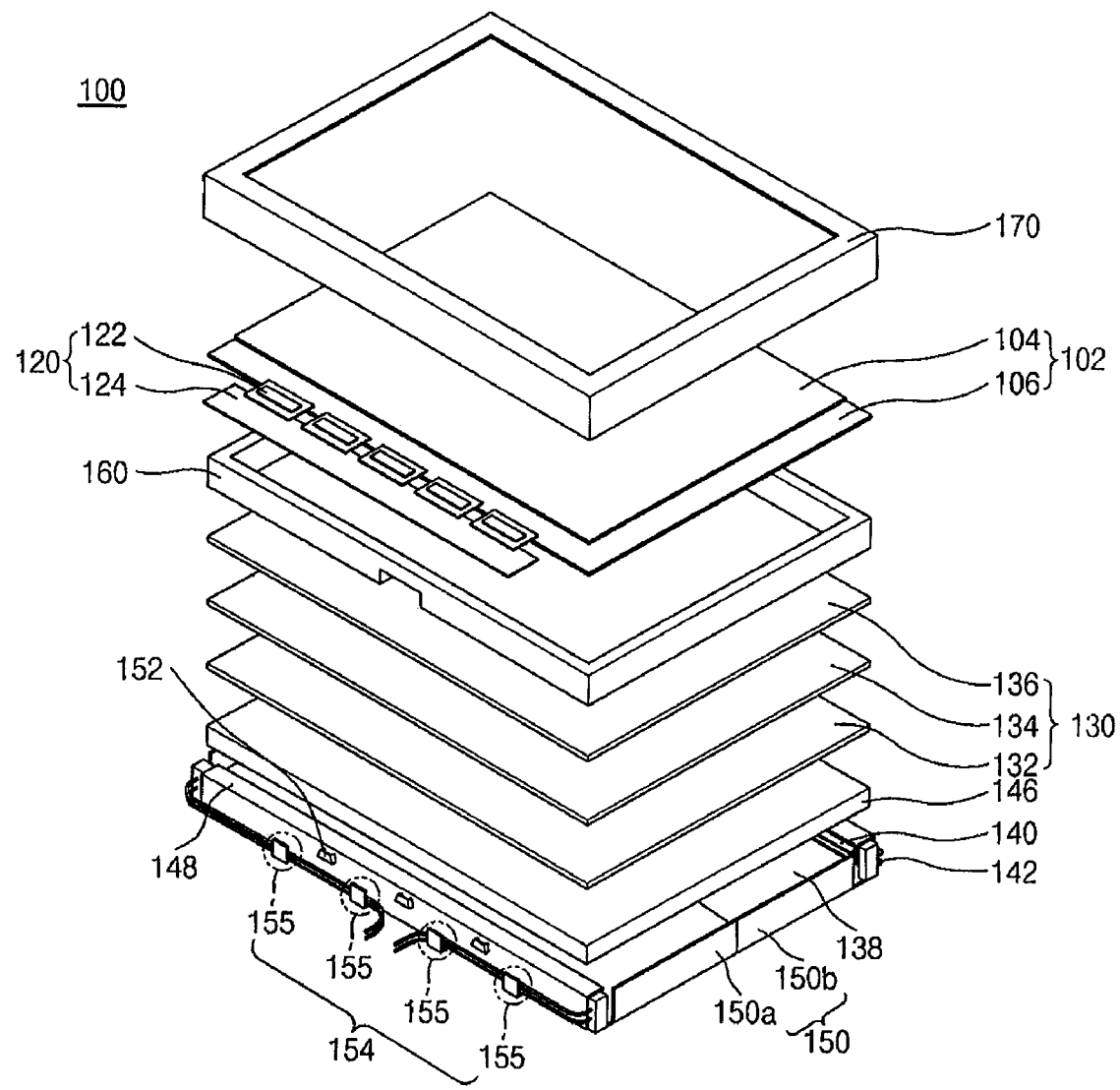
FIG. 1 is an exploded perspective view showing a liquid crystal display according to a first embodiment of the present invention.

Hereinafter, the present invention will be explained in more detail with reference to the accompanying drawings. In addition, the size of layers and regions shown in the drawings can be simplified or magnified for the purpose of clear explanation.

The above and other advantages, and a scheme for the advantages of the present invention will become readily apparent by reference to the following detailed description when considered in conjunction with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. In addition, the same reference numerals are used to designate the same elements throughout the drawings.

In the following description, when an element (or layer) is referred to as being "on" another element (or layer), the element (or the layer) can be directly on another element (or layer) or intervening layers may also be present therebetween. In addition, when an element is referred to as being "directly on" other element, intervening layers may not be present therebetween.

The terms "under", "lower", "above" and "upper" can be used to describe the relationship between elements and devices. These relative terms may include directions in drawings and directions of the devices in operation.

FIG. 1 is an exploded perspective view showing a liquid crystal display 100 according to a first embodiment of the present invention.

As shown in FIG. 1, the liquid crystal display 100 includes a liquid crystal display panel 102, a panel driver, a backlight assembly, a mold frame 160, a bottom chassis 150, and a top chassis 170.

The liquid crystal display panel 102 includes a thin film transistor substrate 106 and a color filter substrate 104 that interpose liquid crystals that adjust a light transmittance therebetween and are bonded to each other while facing each other. The color filter substrate 104 includes a black matrix that prevents light leakage, a color filter that is used to realize colors, and a common electrode.

The thin film transistor substrate 106 includes gate and data lines that cross each other, thin film transistors provided at the cross points of the gate lines and the data lines, and pixel electrodes connected to the thin film transistors.

The panel driver includes a data driver (not shown) to drive the gate lines of the liquid crystal display panel 102 and a data driver 120 to drive the data lines.

The gate driver (not shown) includes a gate printed circuit board (PCB) and a gate integrated circuit mounted on a gate tape carrier package (TCP) provided between the gate PCB and the thin film transistor substrate 106. The gate integrated circuit receives a control signal and a power supply signal from a timing controller and a power supply.

The data driver 120 includes a source printed circuit board (PCB) 124 and a data integrated circuit 122 mounted on a data tape carrier package (TCP) provided between the source PCB 124 and the thin film transistor substrate 106.

The data integrated circuit 122 converts pixel data into analog pixel signals to supply the analog pixel signals to the data lines. The source PCB 124 supplies a control signal, a power supply signal, and pixel data, which are transmitted from the timing controller and the power supply, to the data integrated circuit 122.

The backlight assembly includes a light source 140, a light source container 148, a wire 142, a light guide plate 146, a reflective sheet 138, and an optical sheet 130.

The light source 140 includes a cold cathode fluorescent lamp (CCFL) or a hot cathode fluorescent lamp (HCFL). Such a light source 140 includes at least one CCFL. The light source 140 outputs light to the light guide plate 146 after generating the light using power supplied from an exterior source through the wire 142.

In addition, the light source 140 includes a light source substrate (not shown) or light emitting diodes (LEDs) installed in the light source substrate.

The light guide plate 146 uniformly disperses light output from the light source 140 and then guides the light to the liquid crystal display panel 102. To this end, the light guide plate 146 includes transparent acrylic resin, such as PC and PMMA, having superior heat resistance and a superior refractive index.

The reflective sheet 138 is provided below the light guide plate 146. The reflective sheet 138 reflects light, which advances downward from the light guide plate 146, toward the liquid crystal panel 102.

The optical sheet 130 is stacked on the light guide plate 146. The optical sheet 130 includes a diffusion sheet 132 to diffuse light and a prism sheet 134 to collect the light by changing a traveling angle of the light into an angle perpendicular to the liquid crystal display panel 102. The optical sheet 130 further includes a protective sheet 136 to protect the surface of the prism sheet 134. Although the optical sheet 130 according to the present embodiment includes one diffusion sheet 132, one prism sheet 134, and one protective sheet 136, which are sequentially stacked. A plurality of sheets may be used according to the characteristics of products.

The bottom chassis 150 receives the backlight assembly, the mold frame 160 provided at an outer peripheral portion of the bottom chassis 150 while surrounding edge regions of the backlight assembly, and the liquid crystal display panel 102 mounted on an upper end of the mold frame 160. Generally, the bottom chassis 150 may have an integral structure. The liquid crystal display 100 includes the light source container 148, which is integrally formed with the bottom chassis 150 to surround a portion of the light source 140, without an additional lamp cover. The bottom chassis 150 may be divided into first and second parts 150a and 150b such that the light guide plate 146 is easily accommodated into the bottom chassis 150. The light source container 148 includes a fixing section 154 to fix the wire 142. Such a fixing section 154 includes a plurality of fixing members 155. The bottom chassis 150 is coupled to the mold frame 160, which is described later, by a coupling section 152.

The mold frame 160 is provided between the bottom chassis 150 and the top chassis 170 while surrounding the bottom chassis 150, such that the bottom chassis 150 is insulated from the top chassis 170.

The top chassis 170 is coupled with an outer side surface of the mold frame 160, which is coupled with the outer side surface of the bottom chassis 150 by the coupling section 152, while surrounding the edge regions of the liquid crystal display panel 102, thereby preventing movement of internal components of the liquid crystal display 100 and protecting the edge regions of the liquid crystal display panel 102.

Hereinafter, the structure of fixing the wire 142 by the fixing section 154 of the bottom chassis 150 according to the embodiment of the present invention will be described.

Figure 2A:
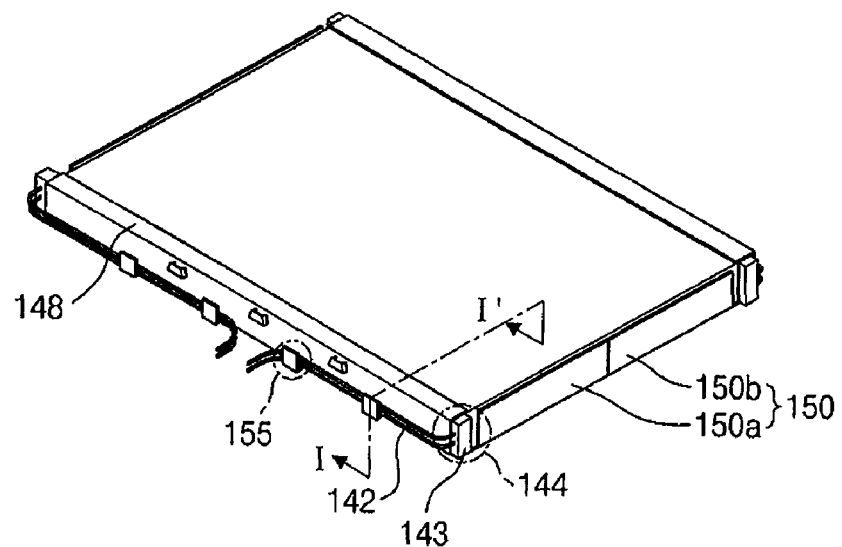
FIG. 2A is a perspective view showing a backlight assembly coupled to a bottom chassis according to the first embodiment of the present invention.
Figure 2B:
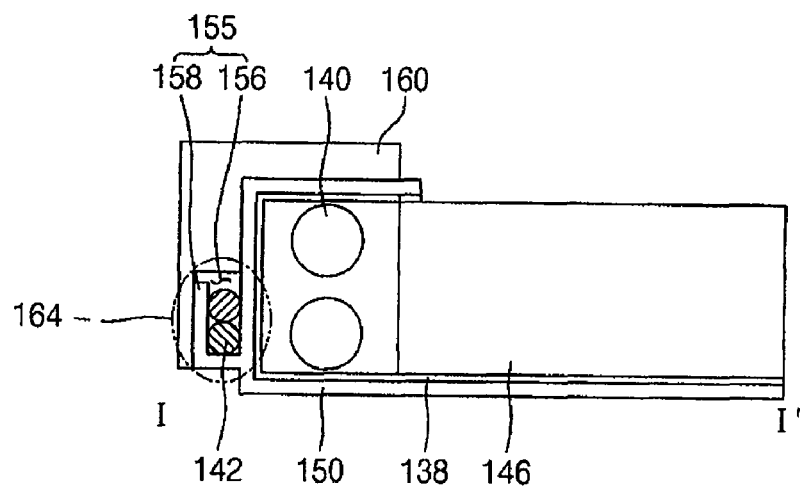
FIG. 2B is a sectional view taken along line I-I' of FIG. 2A after a mold frame has been assembled.

FIG. 2A is a perspective view showing the backlight assembly coupled to the bottom chassis 150 according to the first embodiment of the present invention, and FIG. 2B is a sectional view taken along line I-I' of FIG. 2A after a mold frame 160 has been assembled.

Referring to FIGS. 2A and 2B, according to the first embodiment of the present invention, the fixing section 154 is provided at the side surface of the light source container 148 to fix the wire 142 withdrawn from an wire take-out section 144. The wire take-out section 144 includes a lamp holder 143, and the lamp holder 143 can adjust the take-out direction of the wire 142. According to the present exemplary embodiment, the wire 142 may be withdrawn perpendicularly to the light source 140 by using the lamp holder 143. The fixing section 154 includes a plurality of the fixing members 155 extending outward from the side surface of the light source container 148. Each fixing member 155 includes a nesting section 156 to nest the wire 142 therein, and a hook section 158 that is bent at the end of the nesting section 156 to prevent the wire 142 from being separated from the nesting section 156. Such a hook section 158 may vertically surround the wire 142 from a lower portion to an upper portion of the wire 142. At least one fixing member 155 may be formed at the side surface of the bottom chassis 150. If the wire 142 is stably fixed, the number of the fixing members 155 is not restricted.

The reflective sheet 138 may be attached to the inner surface of the bottom chassis 150. Such a reflective sheet 138 reflects light upward when the light is leaked downward from the light guide plate 146. The reflective sheet 138 extends along a sidewall of the light source container 148 to reflect light, which is emitted from the light source 140 in a direction opposite to a light incident surface, toward the light incident surface. At least a portion of the light source container 148 covers the top surface of the light guide plate 146 provided in the vicinity of the light incident surface of the light guide plate 146. Accordingly, a portion of the reflective sheet 138 is interposed between the top surface of the light guide plate 146 and the light source container 148 covering the top surface of the light guide plate 146.

A fixture groove 164 is formed in the mold frame 160 corresponding to the fixing member 155, so that the outer surface of the mold frame 160 may not protrude when the mold frame 160 is coupled with the bottom chassis 150.

The wire 142 may be provided at the upper end of the light source container 148 of the bottom chassis 150, other than the outer side surface of the light source container 148.

Conventionally, the bottom chassis 150 has an integral structure, in which the backlight assembly is received in the bottom chassis 150 after the backlight assembly has been assembled. However, according to the present embodiment, a lamp cover is not used because the bottom chassis 150 serves as a lamp cover. Accordingly, the bottom chassis 150 may be divided into the first and second parts 150a and 150b to cover a lamp, and then the first and second parts 150a and 150b are coupled to both sides of the light guide plate 146.

Figure 3A:
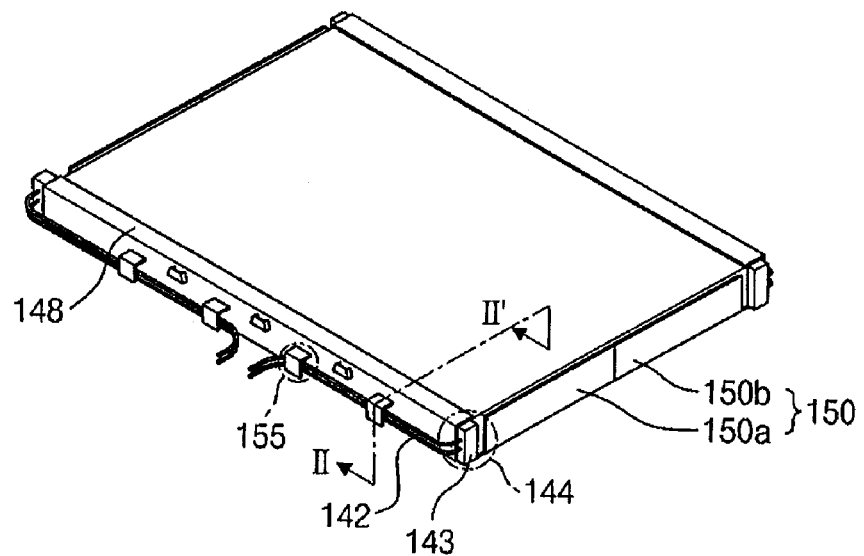
FIG. 3A is a perspective view showing a backlight assembly coupled to a bottom chassis according to a second embodiment of the present invention.
Figure 3B:
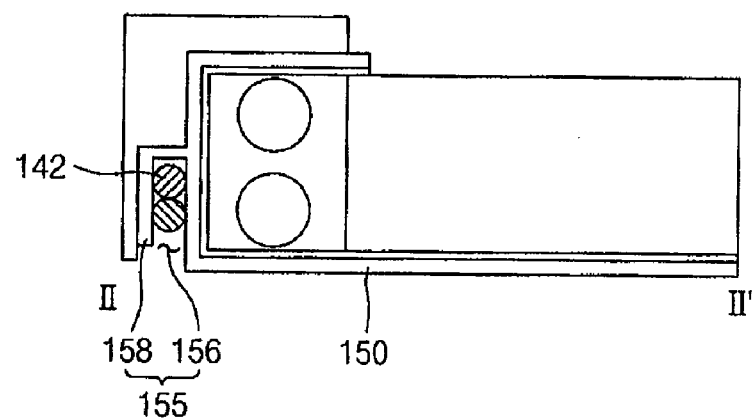
FIG. 3B is a sectional view taken along line II-II' of FIG. 3A after a mold frame has been assembled.

FIG. 3A is a perspective view showing a backlight assembly coupled to a bottom chassis 150 according to a second embodiment of the present invention, and FIG. 3B is a sectional view taken along line II-II' of FIG. 3A after a mold frame 160 has been assembled. For the purpose of convenience of explanation, the same reference numerals will be assigned to elements identical to those of the prior embodiment, and details thereof will be omitted or simplified.

Referring to FIGS. 3A to 3B, according to the second embodiment of the present invention, a fixing section 154 is provided at the side surface of a light source container 148 to fix an wire 142 withdrawn from an wire take-out section 144. The fixing section 154 includes a plurality of the fixing members 155 that extend outward from the side surface of the light source container 148. Each fixing member 155 includes a nesting section 156 to nest the wire 142 therein, and a hook section 158 that is bent at the end of the nesting section 156 to prevent the wire 142 from being separated from the nesting section 156. Such a hook section 158 may vertically surround the wire 142 from an upper portion to a lower portion of the wire 142.

Since elements and features according to the present embodiment are identical to those of the first embodiment, except for the hook section 158 that surrounds the wire 142 from an upper portion to the lower portion of the wire 142, details thereof will be omitted.

Figure 4A:
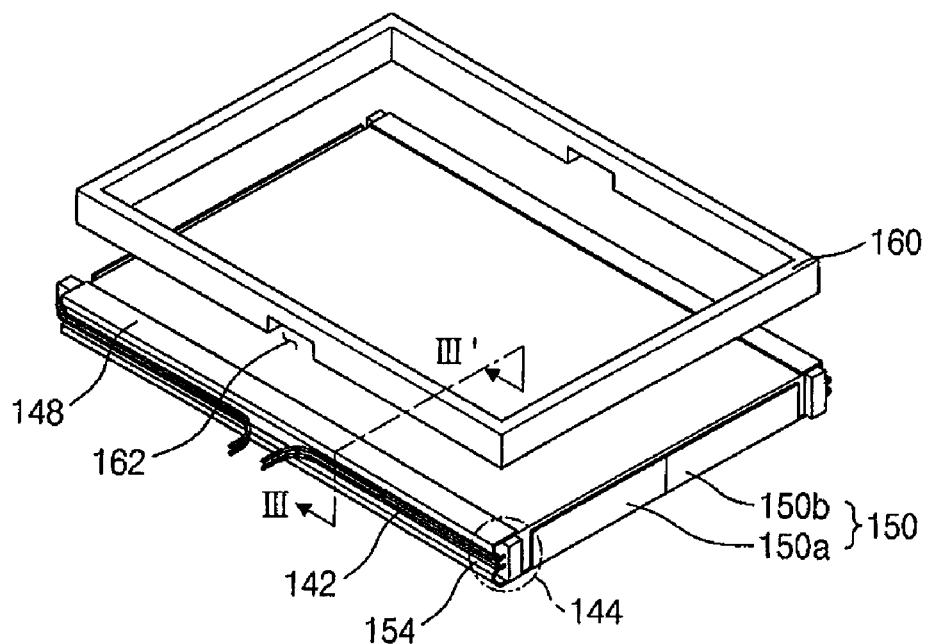
FIG. 4A is a perspective view showing a backlight assembly coupled to a bottom chassis according to a third embodiment of the present invention.
Figure 4B:
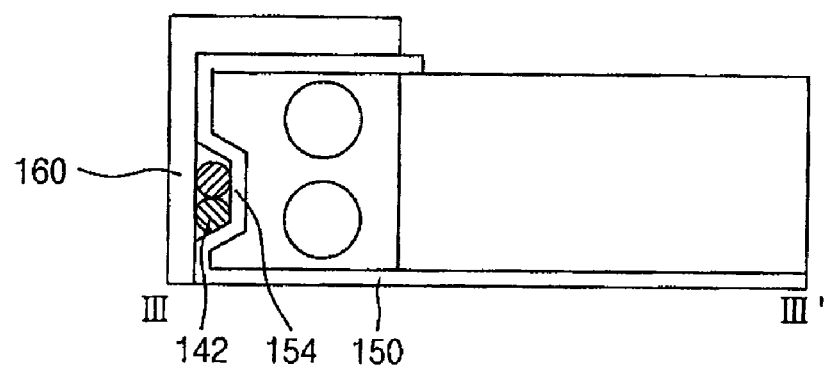
FIG. 4B is a sectional view taken along line III-III' of FIG. 4A after a mold frame has been assembled.

FIG. 4A is a perspective view showing a backlight assembly coupled to a bottom chassis 150 according to a third embodiment of the present invention, and FIG. 4B is a sectional view taken along line III-III' of FIG. 4A after a mold frame 160 has been assembled. For the purpose of convenience of explanation, the same reference numerals will be assigned to elements identical to those of the prior embodiment, and details thereof will be omitted or simplified.

Referring to FIGS. 4A to 4B, a liquid crystal display according to the third embodiment of the present invention includes a fixing section 154 provided at the side surface of a light source container 148 to fix an wire 142 withdrawn from an wire take-out section 144. The fixing section 154 may be prepared in the form of a recess that extends into an interior of the bottom chassis 150 from the side surface of the bottom chassis 150. The wire 142 nested in the fixing section 154 having the form of the recess is supported by the inner sidewall of the mold frame 160 when the mold frame 160 is coupled to the bottom chassis 150. Accordingly, the separation of the wire 142 may be prevented.

Figure 5:
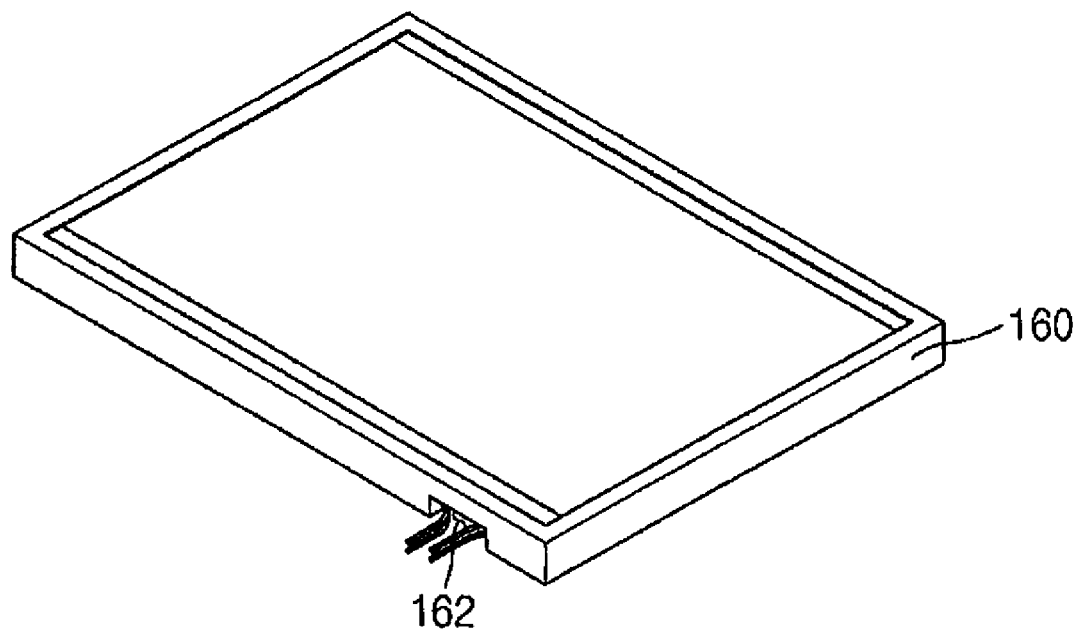
FIG. 5 is an exploded perspective view showing a mold frame according to another embodiment of the present invention.

The mold frame 160 includes a wire take-out port 162 to withdraw the wire 142 to the outside of the mold frame 160 when the mold frame 160 is coupled to the bottom chassis 150. Although such an wire take-out port 162 may be formed at the center portion of the side surface of the mold frame 160, the position of the wire take-out port 162 is not limited thereto. For instance, as shown in FIG. 5, the wire take-out port 162 may be formed at the edge of the side surface of the mold frame 160.

Since elements according to the present embodiment are identical to those of the above first embodiment, except for the structure of the fixing section 154, details thereof will be omitted.

According to the above, a fixing section is provided in a bottom chassis to fix a wire for a light source, thereby preventing the wire from being separated, and preventing the liquid crystal display from malfunctioning through a stable wire fixing structure.

In addition, the stable wire fixing structure according to the present embodiments may prevent the wire from being pressed or delaminated, and prevent the current flow of a backlight assembly from deteriorating.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A liquid crystal display comprising:
    a liquid crystal display panel that displays an image;
    a light source that generates a light;
    a wire connected to the light source;
    a light guide plate that guides the light from the light source to the liquid crystal display panel;
    a bottom chassis that receives the light guide plate and the light source, wherein the bottom chassis is divided into two parts separable with each other; and
    a light source container integrally formed with the bottom chassis and surrounding at least a portion of the light source, wherein the light source container includes a fixing section fixing the wire.

2. The liquid crystal display of claim 1, wherein the light source comprises one of a cold cathode fluorescent lamp and a hot cathode fluorescent lamp.

3. The liquid crystal display of claim 2, further comprising a wire take-out section provided at an end portion of the light source container to withdraw the wire, wherein the wire take-out section includes a lamp holder fixing the end portion of the light source.

4. The liquid crystal display of claim 1, wherein the fixing section includes a fixing member formed at a side surface of the light source container.

5. The liquid crystal display of claim 4, wherein the fixing member comprises:
    a nesting section extending outward from the side surface of the light source container to nest the wire; and
    a hook section being bent at an end of the nesting section to prevent the wire from being separated.

6. The liquid crystal display of claim 5, wherein the hook section surrounds the wire from a lower portion to an upper portion of the wire vertically.

7. The liquid crystal display of claim 5, wherein the hook section surrounds the wire from an upper portion to a lower portion of the wire vertically.

8. The liquid crystal display of claim 1, wherein the fixing section includes a recess that extends inward from a side surface of the light source container.

9. The liquid crystal display of claim 1, further comprising a reflective sheet, wherein the reflective sheet extends along a sidewall of the light source container to reflect the light.

10. The liquid crystal display of claim 9, wherein at least a portion of the light source container covers a top surface of the light guide plate provided adjacent to a light incident surface of the light guide plate.

11. The liquid crystal display of claim 10, wherein a portion of the reflective sheet is interposed between the top surface of the light guide plate and the light source container covering the top surface of the light guide plate.

12. The liquid crystal display of claim 1, further comprising an optical sheet provided between the light guide plate and the liquid crystal display panel, wherein the optical sheet includes a diffusion sheet, a prism sheet, and a protective sheet.

13. The liquid crystal display of claim 1, further comprising a mold frame coupled with the bottom chassis, wherein the mold frame includes a fixing groove corresponding to the fixing section.

14. The liquid crystal display of claim 13, further comprising a top chassis coupled with an outer side surface of the mold frame to protect the liquid crystal display panel and the backlight assembly.

15. The liquid crystal display of claim 1, wherein the bottom chassis comprises;
    a first part; and
    a second part coupled with the first part to receive the light guide plate together the first part.

16. A method of manufacturing a liquid crystal display, the method comprising:
    forming a liquid crystal display panel;
    forming a backlight assembly comprising a light source, a wire connected to the light source and a light guide plate; and
    forming a bottom chassis divided into two parts separable with each other,
    wherein the bottom chassis includes a light source container integrally formed with the bottom chassis and surrounding at least a portion of the light source, and a fixing section fixing the wire.

17. The method of claim 16, wherein the fixing section comprises a fixing member formed at a side surface of the light source container.

18. The method of claim 17, wherein the fixing member comprises:
    a nesting section extending outward from the side surface of the light source container to nest the wire; and
    a hook section being bent at an end of the nesting section to prevent the wire from being separated.

19. The method of claim 18, wherein the hook section surrounds the wire from a lower portion to an upper portion of the wire vertically.

20. The method of claim 18, wherein the hook section surrounds the wire from an upper portion to a lower portion of the wire vertically.

21. The method of claim 16, wherein the fixing section includes a recess that extends inward from a side surface of the light source container.

* * * * *